United States Patent
Wisner

Patent Number: 6,119,402
Date of Patent: *Sep. 19, 2000

[54] POWER SLIDING REAR WINDOW

[75] Inventor: Stephen J. Wisner, Harrison Township, Mich.

[73] Assignee: Lear Automotive Dearborn, Inc., Southfield, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/113,676

[22] Filed: Jul. 9, 1998

[51] Int. Cl.$^7$ .................................................... E05F 11/34
[52] U.S. Cl. ................................................ 49/362; 49/118
[58] Field of Search ............................. 49/360, 362, 381, 49/116, 118

[56] References Cited

U.S. PATENT DOCUMENTS

| | | | |
|---|---|---|---|
| 2,791,420 | 5/1957 | Provost | 49/118 |
| 4,920,698 | 5/1990 | Friese et al. | 49/362 X |
| 5,146,712 | 9/1992 | Hlavaty | 49/118 |
| 5,531,046 | 7/1996 | Kollar et al. | 49/362 X |

*Primary Examiner*—Jerry Redman
*Attorney, Agent, or Firm*—MacMillan, Sobanski, & Todd, LLC

[57] ABSTRACT

A power drive system for driving the sliding rear windows in a pick-up truck includes a rack and pinion drive. In one embodiment, there are two sliding window portions, each associated with individual racks. Preferably, the single pinion drives both racks. In a second embodiment a single central window is utilized. Again, a rack and pinion preferably drives the window.

12 Claims, 1 Drawing Sheet

POWER SLIDING REAR WINDOW

BACKGROUND OF THE INVENTION

This invention relates to a power drive for the sliding rear windows typically found in pick-up trucks.

Power windows are becoming very popular in modern vehicles. Essentially, windows to the sides of the automotive cabs are provided with a motor drive which is operable by a switch to drive the windows upwardly and downwardly. This is often more convenient for the driver, and allows the driver to open windows around the vehicle from switches placed near the driver's seat.

Typically, a pick-up truck is provided with sliding rear window arrangement. The pick-up truck sliding rear windows include fixed windows and sliding windows. The sliding windows are positioned centrally relative to the fixed windows. These windows have always been manually opened.

It would be desirable to have a power drive for driving these windows.

SUMMARY OF THE INVENTION

In a disclosed embodiment of this invention, a pick-up truck rear window arrangement is provided with a drive to move the sliding window for sliding movement relative to the fixed window.

In one preferred embodiment, there are two central sliding windows, and a rack is provided on a frame for each of the windows. The racks engage opposed sides of a pinion gear, and the pinion gear is driven by a motor. When the motor is driven the pinion gear rotates. The pinion gear teeth drive the rack teeth, to move the rack. The frame, and thus the windows, slide between open and closed positions.

In a second preferred embodiment, there is a single central sliding window. The single central sliding window is also provided with a frame having a rack, and the rack is driven with a pinion gear.

Guides for guiding the sliding movement are provided to guide the inventive sliding windows. The guides may be similar to those found in modern vehicles to guide the manually movable sliding windows.

These and other features of the present invention can be best understood from the following specification and drawings, the following of which is a brief description.

DETAILED DESCRIPTION OF A PREFERRED EMBODIMENT

Figure 1:
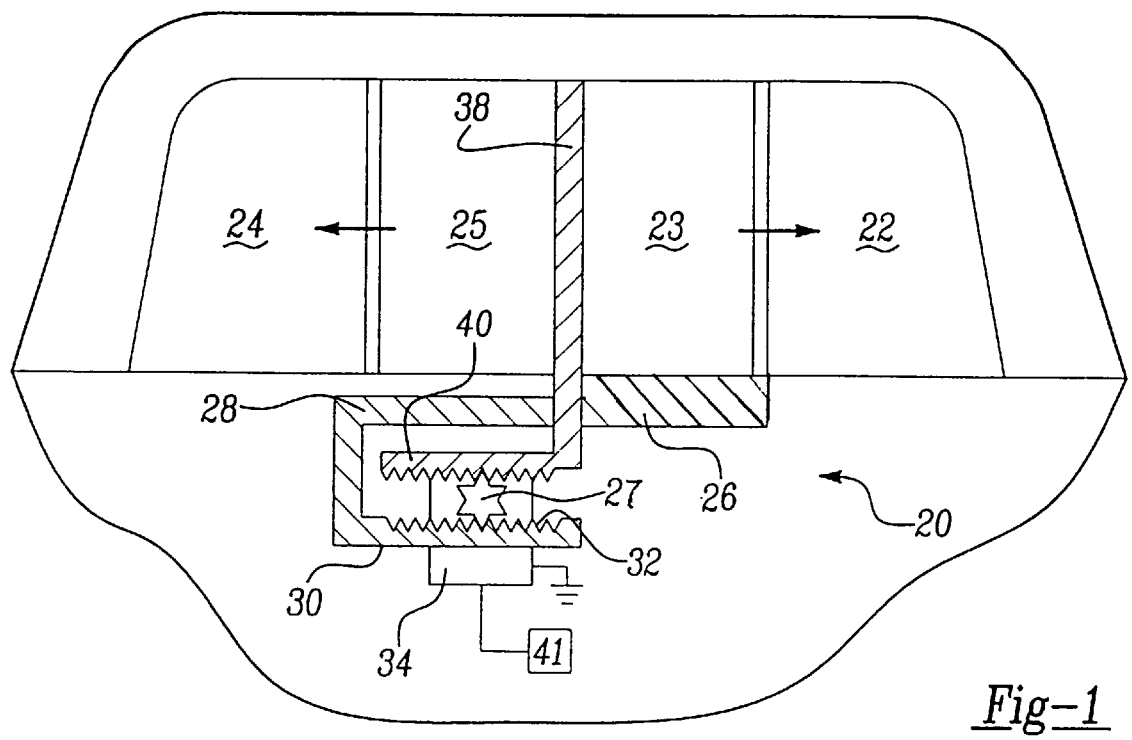
FIG. 1 shows a first embodiment rear window drive.

A pick-up truck rear window arrangement 20 is illustrated in FIG. 1. Outside fixed windows 22 and 24 are associated with central sliding windows 23 and 25. As shown by the arrows, window 23 can slide over fixed window 22 and window 25 slides over fixed window 24.

A rack frame 26 is fixed to window 23 and is attached through a drive portion 28 to a rack portion 30. Rack portion 30 is provided with teeth 32. Thus, the overall combination of portions 26, 28 and 30 provide a U-shaped structure that places the teeth 32 in engagement with a pinion gear driven by a motor 34. The pinion gear 27 also engages teeth from a second frame 38 which drives window 25. Second frame 38 is provided with teeth 40 which also engage the pinion gear 27. Of course, two separate pinion gears may be utilized, however, in the preferred embodiment, a single pinion gear is utilized to drive both windows.

A control is shown schematically at 41. Control 41 includes an operator switch that allows the operator to actuate the motor 34 and drive the windows between the open and closed positions. The details of this control are as known in the art, and form no portion of this invention.

Figure 2:
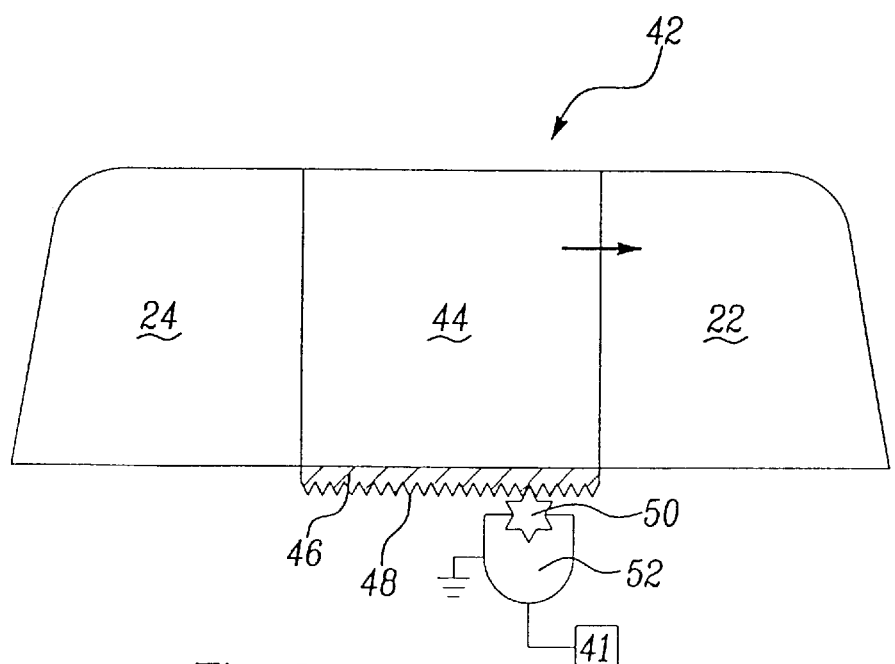
FIG. 2 shows a second embodiment rear window drive.

FIG. 2 shows a second embodiment 42. In second embodiment 42, a single sliding central window 44 slides over the fixed window 22. A frame 46 is attached to one side of the window 44, and rack teeth 48 engage a pinion 50. The pinion 50 is driven by a motor 52, which is associated with a control such as control 41.

In operation of either embodiment, the operator requests the window to be open, and the pinion gear is driven. The racks are moved along with the frames and the window slide as desired.

Preferred embodiments of this invention have been disclosed; however, a worker of ordinary skill in this art would recognize that certain modifications come within the scope of this invention. For this reason, the following claims should be studied to determine the true scope and content of this invention.

What is claimed is:

1. A sliding mechanism for a vehicle rear window comprising:
    a first sliding window mounted upon one end of an L-shaped rigid bracket, said L-shaped rigid bracket including an opposite end having gear teeth which form a first rack;
    a second sliding window mounted upon one leg of a U-shaped rigid bracket, said U-shaped rigid bracket including another leg having rack teeth which form a second rack; and
    a pinion gear which engages said gear teeth on said first and second racks, said pinion gear cooperating with said first and second racks to slide both said first and second windows in opposite directions.

2. A sliding mechanism as recited in claim 1, wherein said windows are placed in the rear of a pick-up truck cab.

3. A sliding mechanism as recited in claim 2, wherein said first and second sliding windows are central sliding windows and further including a pair of outer fixed windows and further wherein said central sliding windows slide in opposed directions over respective ones of said fixed windows.

4. A sliding mechanism as recited in claim 3, wherein said rack teeth are disposed on opposed sides of said pinion gear.

5. A sliding mechanism as recited in claim 4 further including a motor connected to said pinion gear, said motor operable to rotate said pinion gear to move said slidable windows.

6. A sliding mechanism as recited in claim 5 further including an operator control connected to said motor, said operator control operable by a vehicle operator to actuate said motor and thereby move said sliding windows over said fixed windows.

7. A sliding rear window assembly mechanism for a vehicle comprising:
    at least one fixed window;
    a sliding window adjacent to said fixed window, said sliding window offset from said fixed window to allow said sliding window to move over said fixed window, said sliding window defining a sliding window plane;
    a rigid bracket attached to an edge of said sliding window, said bracket including a portion having gear teeth extending from an edge of said bracket and away from said sliding window, said gear teeth defining a rack, said bracket and gear teeth lying in said sliding window plane; and a pinion gear which lies in said sliding window plane and has an axis of rotation, said pinion gear axis of rotation being perpendicular to said sliding window plane, said pinion gear engaging said rack gear teeth, said pinion gear being operable to move said sliding window over said fixed window.

8. A sliding mechanism as recited in claim 7, wherein said sliding window slides over said fixed window.

9. A sliding mechanism as recited in claim 7 further including a motor connected to said pinion gear, said motor operable to move said sliding window.

10. A sliding mechanism as recited in claim 9 further including an operator control connected to said motor, said operator control operable by a vehicle operator to actuate said motor and thereby move said sliding window over said fixed window.

11. A sliding mechanism as recited in claim 9 wherein said fixed window is a first fixed window and further wherein the sliding mechanism also includes a second fixed window, said first and second fixed windows being outer windows, said sliding window moving over one of said first and second fixed windows.

12. A sliding mechanism as recited in claim 11 wherein said windows are placed in the rear of a pick-up truck cab.

* * * * *